July 8, 1958  T. M. BONDHUS  2,842,227
SPRING DRIVE AND CLUTCH
Filed Nov. 16, 1954
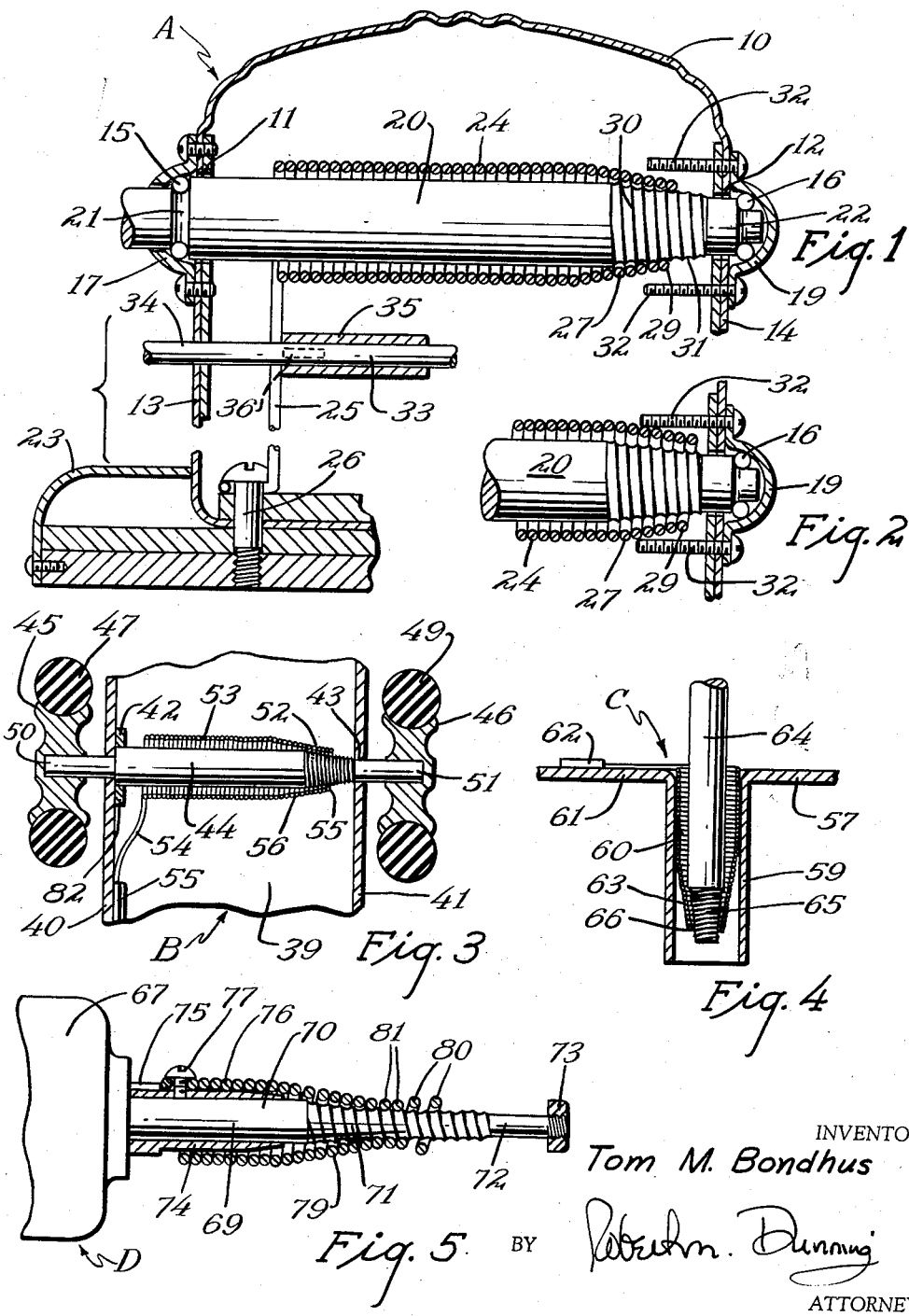
INVENTOR
Tom M. Bondhus
BY
ATTORNEY

United States Patent Office 2,842,227
Patented July 8, 1958

2,842,227

SPRING DRIVE AND CLUTCH

Tom M. Bondhus, Monticello, Minn.

Application November 16, 1954, Serial No. 469,239

7 Claims. (Cl. 185—37)

This invention relates to an improvement in spring clutches and deals particularly with a spring device capable of being wound to provide a driving or impelling force.

Various types of spring motors and the like have been produced. Many of these devices comprise helical springs which are secured from rotation at one end and secured to a shaft or other rotating member at the other end. When the rotatable member is turned in one direction the spring is tightened and usually reduced in diameter to provide a potential torsional force tending to rotate the rotatable member in the opposite direction. In many cases the rotatable member comprises a shaft extending through the spring so as to hold the spring from flexing out of alignment. In other words, the convolutions of the spring tend to twist out of axial alignment with other convolutions when the spring is wound and some means is usually required to prevent excessive distortion. This means may comprise the rotatable member itself or may comprise a sleeve extending within or encircling the spring to prevent excessive distortion. An object of the present invention lies in the provision of a spring clutch which normally includes a spring motor which is wound and unwound. One end of the spring which is normally helical in form is held from rotation. The other end of the spring is so constructed as to grip the rotatable member as the spring is wound so that rotation of the rotatable member will wind the spring. At the same time the connection between the spring and the rotatable member is so constructed as to release from binding engagement with the shaft when the spring becomes unwound so as to permit continued rotation of the rotatable member. In other words, the spring normally acts to some degree at least as a spring motor which is connected to the shaft with an overrunning clutch arrangement.

An object of the present invention lies in providing a spring with a tapered end and providing a rotatable member so shaped as to be gripped by the tapered spring end as the spring is wound. Upon rotation of the rotatable member in the opposite direction, the spring unwinds, driving the rotatable member in a reverse direction and then releasing its tapered end from the rotatable member when the spring is unwound so as to permit continued rotation of the rotatable member.

A feature of the present invention lies in the simplicity of its construction and the low cost at which the structure may be produced. In forming the device, it is only necessary to wind a spring, usually of the helical type, with an inwardly tapered end, the successive spring convolutions decreasing in diameter toward the end of the spring. The rotatable member may comprise any rotatable element such as a shaft or sleeve which also preferably tapers at one end or inwardly of the tapered spring end. This tapered shaft or sleeve is preferably threaded or at least roughened so that the spring may grip the tapered surface as the spring is wound, locking the spring and shaft from relative rotation. Preferably the taper of the spring is greater than the taper of the shaft or sleeve so that the extremity of the spring will wrap itself about the tapered shaft or sleeve to prevent relative rotation when the spring is wound. At the same time rotation of the shaft in the opposite direction will cause the tapered end of the spring to unwrap from the shaft or sleeve and to move toward the smaller diameter portion of the shaft or sleeve so as to produce an overrunning clutch arrangement.

An added feature of the present invention resides in the fact that rotation of the shaft in one direction will have no particular affect upon the spring. As a result the shaft may be rotated in one direction without any substantial added friction.

A further feature of the present invention resides in the provision of a means for holding the tapered spring end centered with respect to the shaft in one form of construction. The centering device functions when the spring is unwound and where a minimum of friction is desired to hold the tapered end of the spring spaced from the shaft.

Another added feature of the preferred form of construction of my apparatus lies in the provision of a spiral thread or groove in the tapered end of the rotatable member. When the extremity of the spring engages this groove, rotation of the shaft will tend to thread the end of the spring toward the larger diameter end of the tapered portion, thus securely locking the two parts from relative rotation as long as the rotation of the rotatable member is in a direction to wind the spring. However, as the spring is unwound and the tension is released, the tapered end of the spring will wind downwardly toward the smaller diameter end of the rotatable element until the locking action between the spring and rotatable element is released. Thereafter the rotatable member may continue its rotation.

A feature of the invention lies in the many uses to which the structure may be put. The apparatus is very succesfully employed in a centrifugal molding machine in which the spring acts as a motor and rotates a radially extending arm having at one end a mold such as that used in dental casting. The device has also been successfully incorporated as a spring motor for a wheeled toy. When the wheels are rotated in one direction the spring will be wound. When released the spring will drive the toy and then release its driving action so that the momentum of the toy will carry it considerably beyond its usual distance with a spring motor of conventional type. The device has also been successfully employed in a structure embodying a propeller, the spring winding up when the propeller bearing a central shaft is rotated in one direction. When released, the propeller will rotate at high speed until the spring is unwound and will then release and propel itself away from the driving spring. The structure may also be used in devices such as automobile starters in which torque is transmitted from the driving motor through the spring to a drive pinion or the like which in turn is connected to the motor flywheel. When the speed of rotation of the pinion exceeds that of the motor, the spring will unwind until it is free of the drive motor shaft and can rotate freely thereby.

These and other objects and novel features of my invention will be more clearly and fully set forth in the following specification and claims.

In the drawings forming a part of the specification:

Figure 1 is a sectional view through a portion of a centrifugal molding apparatus showing the spring motor and clutch in place thereupon.

Figure 2 is a sectional detail of a portion of the structure of Figure 1 showing the spring in unwound position.

Figure 3 is a sectional view through a portion of a wheeled toy showing the motor and clutch associated therewith.

Figure 4 illustrates diagrammatically a toy in which the rotatable element may actually disengage itself from the driving spring.

Figure 5 is a diagrammatic view partly in section showing the manner in which the structure may be applied to an automobile starting motor or the like.

In Figures 1 and 2 of the drawings I disclose a spring motor and clutch of the type which has been employed in a centrifugal casting machine fragmentarily shown by the letter A. The casting machine A includes a supporting housing 10 having opposed apertures 11 and 12 in opposite walls 13 and 14 respectively. Anti-friction bearings 15 and 16 are supported by bearing caps 17 and 19 encircling the apertures 11 and 12. The bearings 15 and 16 support a shaft 20 which comprises the rotatable element of the structure. In the particular arrangement illustrated the bearing 15 rotates in a bearing groove 21 in the shaft 20 and against a shoulder 22 at the opposite end of the shaft 20 so as to hold the shaft from appreciable longitudinal movement. The casting machine A also includes a base such as 23 which is partially shown for the sole purpose of showing some part of the housing to which the spring may be anchored. The spring 24 encircles shaft 20 and is provided with a tangentially extending anchoring arm 25 secured to the base 23 by a bolt or cap screw 26. The purpose of this elongated arm 25 will be later described in detail.

The spring 24 is provided with a tapered extremity 27, the end convolution 29 of which is of considerably smaller internal diameter than the diameter of the body portion of the shaft 20. The shaft 20 is provided with a tapered portion 30 inwardly of the tapered portion of the spring 24. The tapered shaft portion 30 is preferably provided with a spiral thread or groove 31 which is of proper size to accommodate the end spring convolution 29.

A centering cage is provided for holding the spring 24 centered with respect to the shaft 20. In the particular arrangement shown this cage comprises an angularly spaced series of pins 32 which extend inwardly from the housing wall 14. As indicated in Figure 2 of the drawings these pins 32 may engage the outer surface of the tapered portion 27 of the spring 24 when this spring is entirely released from a shaft 20 and is unwound.

In the form of construction illustrated in Figures 1 and 2, the spring 24 is movable a short distance axially of the shaft 20. An operating shaft 33 is slidably supported to extend through the opening such as 34 in the walls 13 and 14 of the housing. The shaft 33 is provided with a lug or sleeve 35 secured thereto which bears against the anchor arm 25 of the spring 24. In other words the anchoring end 25 of the spring extends upwardly near the shaft 33 and either the end of the sleeve 35 or a laterally extending lug 36 thereupon engages against the arm 25 to move this arm in a direction parallel to the axis of the shaft 20.

When the spring 24 is completely unwound, the spring 24 has its tapered end 27 engaged by the cage 32 so that the tapered spring end freely encircles the shaft 20. In this position the shaft 20 will rotate freely. However, if the shaft 33 is urged to the left into the position shown in Figure 1 of the drawings, the sleeve 35 or lug 36 engages against the anchor arm 25 flexing the upper end of this arm to the left and moving the entire spring 24 to the left upon the shaft 20. When in this position, as shown in Figure 1, the end convolution 29 at the tapered end of the spring engages upon the tapered portion 30 of the shaft 20. By rotating the shaft 20 in a direction to thread the small diameter end of the spring toward the large diameter portion of the shaft 20, the tapered spring end is tightly gripped by the shaft and this tapered end is then rotated in a direction to wind the spring 24.

In actual practice the shaft 20 supports a generally radially extending arm which supports a mold of the type used for the centrifugal casting of crowns, inlays and the like used in dentistry. The mold is applied to the arm (not shown in the drawing) when the spring is wound and the arm is then released. The spring unwinds, rotating the shaft 20 in a reverse direction. When the spring is unwound, the small diameter end 29 of the spring unthreads and the normal resilience of the anchoring end 25 of the spring moves the spring end into engagement with the cage 32. In actual practice the rod 33 serves the double purpose of moving the spring into engagement with the shaft and holding the shaft from rotation by engagement with the arm on the shaft 20 which supports the dental mold.

The particular embodiment of the apparatus has been described in detail as it serves unusually well for this purpose. For example, in the operation described it is necessary to start the mold supporting arm quickly so that centrifugal force is almost immediately applied to the melted or fluid material being cast. Secondly, the arrangement is such that when the spring is unwound the shaft will continue to rotate a sufficient length of time to allow the molten material to set. However, the description is merely indicative of one of many types of uses to which the structure may be put.

In Figure 3 of the drawings the spring motor and clutch is shown as applied to a wheeled toy or the like. The body of the toy is only fragmentarily shown as the particular nature of the structure is unimportant in the present invention. For the purpose of description it is believed sufficient to state that the toy B includes a body 39 having spaced parallel side members 40 and 41. These side members are apertured at 42 and 43 respectively to accommodate the wheel axle or shaft 44. Wheels 45 and 46, usually embodying tires or outer surfaces 47 and 49 made of a material having a relatively high co-efficient of friction such as rubber are mounted on the reduced diameter ends 50 and 51 of the shaft 44. The shaft 44 includes a tapered portion 52 which leads from the larger diameter center portion of the shaft to the smaller diameter shaft end 51. This tapered portion 52 is preferably roughened or is provided with a spiral groove similar to that shown in Figures 1 and 2.

A spring 53 encircles a shaft 44 and is provided with an anchoring end 54 anchored at 55 to one side 40 of the body. The arm 54 is so shaped as to apply a slight bias tension tending to direct the spring 53 to the left so that the end convolution 55 of the tapered portion 56 of the spring will be urged toward engagement with the tapered portion 53 of the shaft 44.

In operation the wheels 45 and 46 are rotated in a direction to wind the spring 53, the end spring convolution 55 being threaded on, or engaging with friction against, the tapered shaft portion. This causes the spring end to rotate with the shaft 44 until the spring 53 is fully wound. If the toy is then placed upon a flat surface and the wheels released the spring will unwind, driving the toy at a high rate of speed until the spring is unwound. The tapered portion 52 of the spring then unthreads from the tapered portion of the shaft and the shaft continues to rotate by the momentum of the shaft and toy for a considerable distance.

It is interesting to note that while the spiral threaded construction of the shaft is somewhat more positive, the spring end will grip the shaft if there is sufficient friction between the spring end and the shaft, this friction being important only when the shaft rotates in a direction to wind the spring. It should also be noted that in this arrangement the spring does not entirely disengage from the shaft, each revolution of the shaft tending to thread the spring end toward the small diameter end 51 of the shaft until the spring slips over the thread. While this arrangement creates a slight friction, it is less expensive than the spring centering arrangement shown in Figures 1 and 2.

In Figure 4 of the drawings I disclose a top C which is also shown only fragmentarily. In this arrangement the toy includes a base 57 including a vertical sleeve 59. A spring 60 is mounted within the sleeve 59 and is held from excessive distortion thereby. The spring 60 is provided with an anchoring arm 61 anchored at 62 to the base 57. The spring 60 is also provided with a tapered end 63.

A vertical shaft is removably supported within the spring 60, the shaft 64 including a tapered portion 65 which is preferably spirally threaded to engage the end convolution or convolutions of the spring 60. In one form of toy the shaft 64 supports a propeller which tends to pull the shaft upwardly when the shaft is rotated.

When the shaft 64 is rotated in one direction, the end convolution 66 threads onto the tapered portion 65 of the spring, tending to wind the spring. When the spring has been sufficiently wound the shaft 64 is released and the spring unwinds, rotating the shaft in the opposite direction which may tend to rotate the propeller to exert an upward pull upon the shaft. When the spring becomes unwound the end unthreads from the spring end and the shaft suddenly is released to fly upwardly.

In the foregoing examples, the rotatable member has been described as a shaft and the spring end has been described as stationary. Obviously the arrangement can be reversed and the spring supporting structure may rotate about the fixed shaft. Furthermore, the various shafts have been described as having large diameter portions, small diameter portions and the like. Actually this arrangement is advantageous as the shaft may hold the spring from excessive distortion. However, the rotatable member may be of any of a great number of shapes and may be tubular or otherwise constructed as long as it involves the features of the present invention.

In Figure 5 of the drawings another modified form of construction is shown diagrammatically and identified in general by the letter D. The apparatus D is designed as a connection between a starter motor and an engine or in some similar capacity. The apparatus D includes a starting motor 67 having a motor shaft 69 illustrated as having a cylindrical portion 70, a tapered portion 71, and a smaller diameter portion 72. Shoulder forming means 73 is also provided at the end of the shaft 72.

A sleeve 74 encircles the shaft portion 70 and is provided with a pinion 75 which may engage the ring gear of an automobile engine.

A spring 76 encircles the sleeve 74 and is anchored at one end thereto as indicated at 77. The spring 76 includes an inwardly tapering end portion 79 which terminates in an outwardly tapering extremity 80. The tapered portion 71 of the shaft 69 as well as a part of the small diameter portion 72 are preferably grooved to accommodate the smallest convolution or convolutions 81.

In operation when the motor 67 is started, the shaft 69 is rotated in a direction to rotate the automobile ring gear and to start the engine of the car. When rotated in this direction the smallest spring convolutions 81 are threaded onto the shaft in a manner to move these convolutions onto the tapering shaft portion 71 thereby locking this portion of the spring to the shaft 69. The torque is transmitted through the spring 76 to the sleeve 74 rotating the pinion 75.

This arrangement is particularly advantageous in cold weather or when the car engine does not turn over easily as the winding of the spring permits the starting motor to get up speed before the engine starts to turn over. When the spring is sufficiently wound the ring gear is rotated to turn over the motor.

As soon as the speed of the ring gear and of the pinion 75 exceeds that of the shaft 69, the spring 76 unwinds. When the spring tension is released, the small diameter convolutions of the spring 81 unthread along shaft 69 until the spring extremity 80 is against the shoulder 73. When in this position, the spring may rotate freely until the engine stops. The spring end 80 possesses just sufficient tension to urge the spring convolutions 81 against the threaded portion of the shaft so that the action may be repeated.

The proportions of the springs shown are not in some instances correct for the purpose to which the device is used, the diameter of the spring being enlarged in some instances for the purpose of illustration and the length of the spring in Figure 5 being somewhat shorter than may be desirable so that the construction may be illustrated. However, the structure illustrated is for the purpose of example and will function correctly. As there is in some instances end play in the rotating shaft, it is desirable to eliminate any possibility that the anchored end of the spring become wedged between the shaft and any part of the frame. For example, in the embodiment shown in Figure 3, the spring end might have a tendency to wedge between the large diameter portion of the shaft 44 and the frame side 40. In such a case a washer or bearing plate such as 82 may be provided against which the large end of the spring may bear.

In accordance with the patent statutes, I have described the principles of construction and operation of my improvement in spring clutches, and while I have endeavored to set forth the best embodiment thereof, I desire to have it understood that obvious changes may be made within the scope of the following claims without departing from the spirit of my invention.

I claim:

1. A spring clutch device comprising a rotatable member, a generally conical portion of said rotatable member, a torsion spring having a conical end encircling the conical end of said rotatable member, the smallest convolution of the spring being of smaller diameter than the larger diameter end of said generally conical portion of said rotatable member, means normally spaced from said spring and encircling said spring for holding said spring from undue distortion, and means anchoring the other end of the spring, rotation of the rotatable member relative to the part to which the other end of the spring is anchored in one direction acting to wrap said spring about said rotatable member and to hold the conical end of the spring from rotation relative to the rotatable member, said conical portion of said rotatable member including means engageable with the conical end of said spring, rotation of the rotatable member in the opposite direction being substantially unimpeded.

2. A spring clutch unit including two parts which are relatively rotatable, one of said parts including a tapered surface, the other of said parts comprising a torsion spring having a tapered end, the smallest diameter convolution of the tapered end of the spring having an internal diameter less than the external diameter of said one part, said parts being axially movable, and means forming a portion of the second part to which the other end of said torsion spring is anchored, means normally holding said tapered spring end spaced from said tapered surface relative rotation between said parts in one direction upon axial movement of said spring causing the tapered end of said spring to grip the tapered portion of said one part and to hold said one part from relative rotation with respect to said tapered spring end, rotation between said parts in the opposite direction tending to release the tapered end of the spring from gripping engagement with the tapered portion of said one part.

3. The construction described in claim 2 and in which the tapered portion of said one part is grooved to accommodate the tapered end of the spring.

4. The construction described in claim 2 and including means for holding the tapered end of the spring free from engagement with said one part.

5. The spring motor and clutch unit including a rotatable member, a tapered portion on said rotatable member, a torsion spring having a tapered end encircling the tapered portion of said rotatable member, a spiral groove in the tapered portion of said rotatable member designed to accommodate the smallest diameter convolution of said spring to move the smallest diameter spring end toward the large diameter end of the tapered portion of said rotatable member upon rotation of said rotatable member in one direction, means for anchoring the other end of said spring, rotation of said rotatable member in the opposite direction tending to release the tapered end of said spring from engagement with the tapered portion of said rotatable member, said spring being slidable axially of said rotatable member to move said tapered spring end into or out of engagement with said tapered portion of said rotatable member.

6. The spring motor and clutch unit including a rotatable member, a tapered portion on said rotatable member, a torsion spring having a tapered end encircling the tapered portion of said rotatable member, a spiral groove in the tapered portion of said rotatable member designed to accommodate the smallest diameter convolution of said spring to move the smallest diameter spring end toward the large diameter end of the tapered portion of said rotatable member upon rotation of said rotatable member in one direction, means for anchoring the other end of said spring, rotation of said rotatable member in the opposite direction tending to release the tapered end of said spring from engagement with the tapered portion of said rotatable member, said spring being slidable axially of said rotatable member so that the tapered end of the spring may be moved toward or away from the tapered portion of said rotatable member, and including means for engaging the tapered end of the spring when moved away from the tapered portion of the rotatable member to hold the spring spaced from the rotatable member.

7. The spring motor and clutch unit including a rotatable member, a tapered portion on said rotatable member, a torsion spring having a tapered end encircling the tapered portion of said rotatable member, a spiral groove in the tapered portion of said rotatable member designed to accommodate the smallest diameter convolution of said spring to move the smallest diameter spring end toward the large diameter end of the tapered portion of said rotatable member upon rotation of said rotatable member in one direction, means for anchoring the other end of said spring, rotation of said rotatable member in the opposite direction tending to release the tapered end of said spring from engagement with the tapered portion of said rotatable member, said rotatable member being axially disengageable from said spring.

References Cited in the file of this patent

UNITED STATES PATENTS

| | | |
|---|---|---|
| 1,166,379 | Ludlam | Dec. 28, 1915 |
| 1,485,036 | Kingsley | Feb. 26, 1924 |
| 2,461,784 | Streed | Feb. 15, 1949 |
| 2,614,629 | Bleibtreu | Oct. 21, 1952 |
| 2,626,029 | Gutterman | Jan. 20, 1953 |